United States Patent

Harwood

[15] 3,663,744

[45] May 16, 1972

[54] SELECTIVE TINT CORRECTION CIRCUITS

[72] Inventor: Leopold Albert Harwood, Somerville, N.J.

[73] Assignee: RCA Corporation

[22] Filed: July 22, 1970

[21] Appl. No.: 57,280

[52] U.S. Cl. ....................................................... 178/5.4 HE
[51] Int. Cl. ....................................................... H04n 9/12
[58] Field of Search ....................................... 178/5.4, 5.4 HE

[56] References Cited

UNITED STATES PATENTS 3,525,802 8/1970 Whiteneir, Jr. .................... 178/5.4 HE

*Primary Examiner*—Richard Murray
*Attorney*—Eugene M. Whitacre

[57] ABSTRACT

Tint correction is provided in a color television system by altering the phase of the color subcarrier reference signal before application of this signal to color demodulators. Phase alteration is accomplished by monitoring the chrominance signals prior to demodulation to determine whether they possess phase components about the flesh axis. If such components exist, the chrominance signal is vectorially added to the reference oscillator signal to provide a new phased oscillator signal which, when applied to the demodulators, causes them to provide color signals representative of flesh tone.

11 Claims, 4 Drawing Figures

INVENTOR.
LEOPOLD A. HARWOOD
BY [signature]
Attorney

INVENTOR.
LEOPOLD A. HARWOOD
BY [signature]
Attorney

INVENTOR.
LEOPOLD A. HARWOOD
BY [signature]
Attorney

SELECTIVE TINT CORRECTION CIRCUITS

This invention relates to color television apparatus and, more particularly, to apparatus and techniques for automatically compensating for errors which affect the flesh tone reproduction capabilities of the system.

It has long been known that during a color television transmission, the displayed image of a receiver shows flesh tones or hues and other closely associated hues with green and purple casts and shadings.

Such errors are caused by small phase errors which may occur due to propagation path changes, channel changes, the shifting between cameras at the studio, studio lighting, changes from live to tape transmissions or vice versa, and so on.

In the major portion of the color spectrum, small phase errors are not usually noticeable. For example, a viewer realistically cannot discriminate between different shades of green, blue or red as he has no basis for comparing displayed colors with the actual colors. In any event, most viewers are well acquainted with normal flesh tone and can easily discriminate between flesh tone changes. This is especially true when there is enough phase error to produce the above-mentioned green and purple casts.

An early recognition of this problem and a solution therefor is presented in U. S. Pat. No. 2,888,514 entitled "Color Television," issued on May 26, 1959, to Dalton H. Pritchard and assigned to RCA. The system depicted therein serves to automatically reduce the errors accompanied with flesh tone reproduction when the errors lie in the purple-green direction. The system takes advantage of the fact that in the large area three-color reproduction, narrow band information is provided to the receiver, whereas relatively wide band information is provided along the preferred orange-cyan axis or "-flesh" axis. The system of Pritchard recognizes that the human eye is adequately satisfied as to the color fidelity of a reproduced image, regardless of bandwidth, if the gamut of colors utilized to reproduce the image is caused to vary in accordance with the degree of color saturation. The obvious psychological errors in color reproduction of flesh tones and hair, both of which are associated with a low degree of saturation, are minimized by controlling the amplitude of the Q signal component which is in quadrature with the "flesh" axis. Utilizing a suitable degree of saturation detection, the output of the Q channel is caused to be either proportionately reduced or completely cut off when an object having a low color saturation is being scanned, and is restored to normal operation when the degree of saturation exceeds a certain predetermined value. Hence, Pritchard shows a solution to the problem by monitoring saturation levels and thereby effecting Q signal amplitude.

The Pritchard system has the effect of minimizing or reducing the green-purple tints in such things as faces and hair, thereby rendering the reproduced color television image more acceptable to the viewer.

In a more recently proposed system, compensation for such phase errors is effected by circuitry used for detecting phase errors in the flesh tone region prior to demodulation of the chrominance signal. The circuitry does this by sensing the phase difference between the reference burst and the color signal and then developing a correction signal to restore the desired hue. The correction signal is generated by two gates and a 3.58 MHz switch which turns on the gates at the proper phase. The system operates and affects the chrominance signal prior to demodulation and as such requires relatively wide band circuitry. In this system chrominance is added to chrominance according to the phase difference detected. Hence, the system is continuously associated with amplitude distortion, as a phase rotation of the chrominance component requires an additional chrominance vector to be added. The resultant signal, although phase compensated, is always more saturated when correction is taking place, than is the signal without correction.

It is an object of this invention to therefore provide improved color television receivers operating from signals transmitted in accordance with television signal specifications.

It is also an object of this invention to provide a means for decreasing green-purple errors in color television image reproduction without substantially affecting saturation of the image.

It is a further object to enhance the color fidelity of the reproduced color image by controlling the gamut of colors utilized in the production of the color image according to the phase, while incorporating relatively simple circuitry.

These and other objects are accomplished by altering the phase of the color subcarrier reference frequency before application thereof to color demodulators. The phase alteration is accomplished by monitoring the chrominance signals prior to demodulation to determine whether they possess phase components about the flesh axis. If such components exist and are in a predetermined vicinity about this axis, the chrominance signal is vectorially added to the reference oscillator signal to provide a new phased oscillator signal, sufficient when applied to suitable demodulators to cause demodulation of the chrominance signals about the desired flesh axis.

For a detailed explanation reference is made to the following specification with the accompanying figures, in which.

Before turning to the embodiments and circuitry associated with the present invention, a brief description will be given involving some of the terms to be discussed. The hue of a color is related to its dominant wavelength. After selecting a standard white, the hue of any color can be expressed by the direction from the point representing the color from the white point on a chromaticity diagram. Examples of chromaticity diagrams are given in the above-noted patent. Saturation sensation given by any color is related to its purity, which is represented by the distance along the radius from the white point to the point representing that particular color as a fraction of the total distance out to the spectrum locus along that same radius. Given any real set of primaries such as the phosphor colors used in reproducing color images by television, one can develop three colored real primaries with their intensities proportioned to give a good white. The techniques for generating various hues and saturated colors from the three primary colors are well known. In the NTSC color system, there is an I signal component which corresponds substantially to the orange-cyan or flesh axis, while the Q component corresponds to the axis at right angles with respect to the I axis. It can be shown that the I and Q components can be explained in terms of the red and blue color difference signals as evidenced by the equations:

$$I = 0.74\,(R-Y) - 0.27\,(B-Y)$$
$$Q = 0.48\,(R-Y) + 0.41\,(B-Y)$$

It is also possible to show how the red and blue color difference signals can be reconstructed by the appropriate values $I$ and $Q$ signals. Namely, $$R-Y = 0.96I + 0.62Q$$
$$B-Y = -1.10I + 1.70Q$$

The green color difference signal can be recovered by matrixing the $I$ and $Q$ signals directly according to the equation:

$$G-Y = -0.281I - 0.64Q$$

Essentially, the above equations show that the problems to be discussed herein can be explained in terms of the $I$ and $Q$ components which all can be referred back to the color difference components or vice versa.

The hue of a color in the NTSC system is determined by the phase difference between the chrominance component and the reference subcarrier frequency; while the saturation of that color is a function of the amplitude of the chrominance component as transmitted. In any correction system, it is therefore desirable that corrections in hue do not affect the chrominance signal amplitude. In this manner, while the hue of the color is changed, the saturation of the color is desirably not affected.

Figures 1, 2:
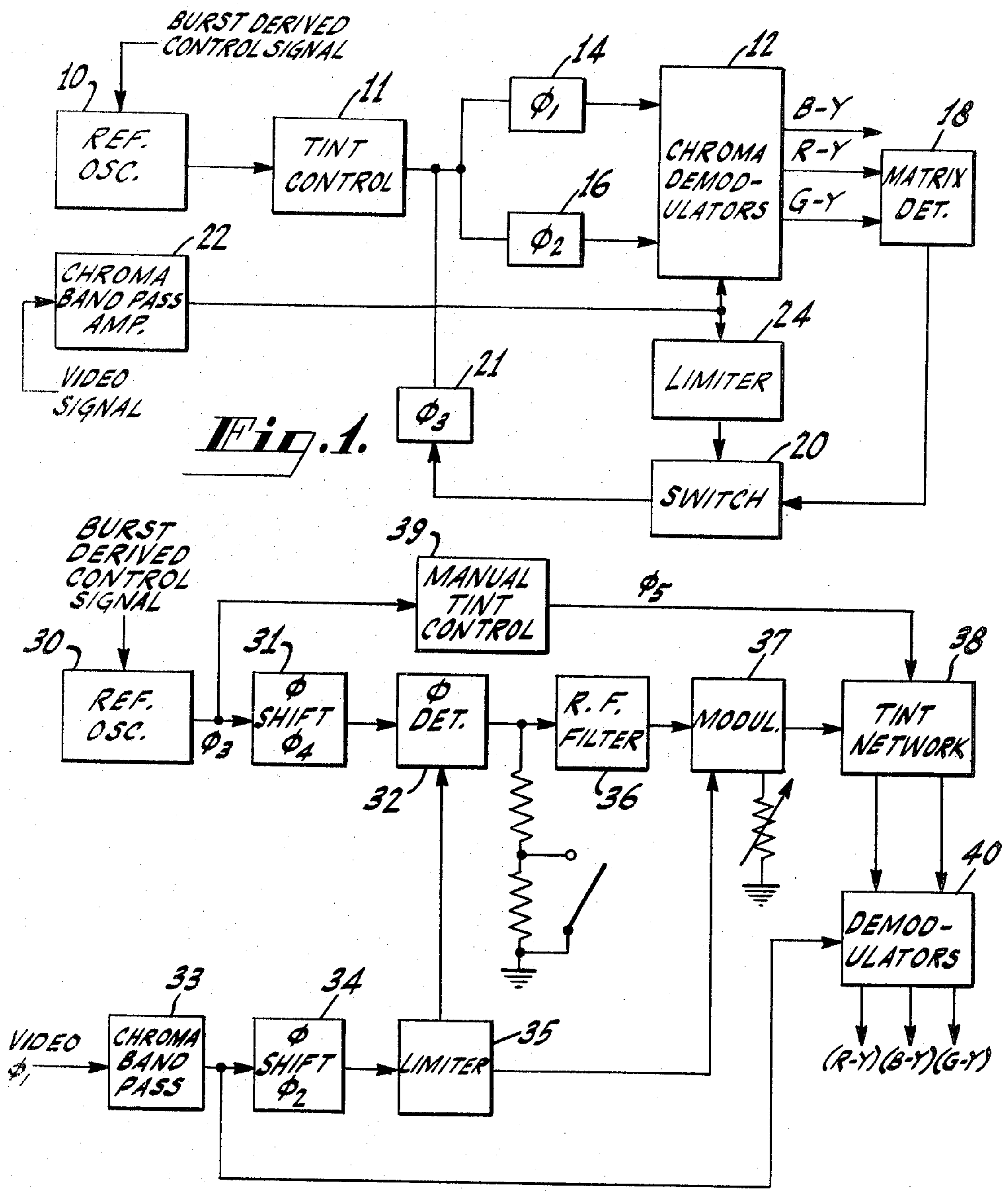
FIG. 1 is a block diagram of automatic tint control circuitry according to this invention.
FIG. 2 is a block diagram of an alternate embodiment according to the invention.

FIG. 1 shows a block diagram of a tint control circuit which serves to reduce the green and purple contamination of facial colors without affecting the amplitude of the chrominance signal.

A reference color oscillator 10 receives the burst signal transmitted during the back porch of the horizontal synchronizing interval, and is locked by the burst signal in phase and frequency. The output of the reference oscillator 10 is applied to a tint control circuit 11, which may be manually adjusted to introduce a desired phase shift to the reference oscillator signal prior to application thereof to the demodulator 12. The output of the tint control circuit 11 is applied to two separate inputs of the chrominance demodulator circuits 12 via separate phase shifting networks 14 and 16. As shown, the demodulation of the chrominance components is accomplished by two demodulators, each of which is gated or driven by a different phased 3.58 MHz color reference oscillator signal. Depending upon the phase angle of the reference oscillator signal as applied to the demodulators, demodulation may be along the above-noted *I* and *Q* axes, or along the axes corresponding to the *R—Y* and *B—Y* color difference signals. In the later system the *G—Y* signal is derived from a suitable matrixing technique. Alternatively, the *G—Y* signal may also be obtained by direct demodulation via a third demodulator circuit. In any event, demodulation circuits and techniques for producing the *I* and *Q* signals or the color difference signals are well known and understood in the prior art.

In the description that follows, it will be assumed that the demodulators 12 perform demodulation for the color difference signals and therefore the outputs emanating from the chrominance demodulators 12 are respectively referred to as *B—Y*, *R—Y* and *G—Y*. The outputs denoted as *R—Y* and *G—Y* are applied to a matrix circuit 18 which develops an I signal output that is applied to the input of a switch circuit 20. The output of switch circuit 20 is applied through a phase shifting circuit 21 and thence to the output of the tint control circuit 11. The chrominance signal input is obtained from the video signal via a chrominance bandpass amplifier 22 having its output coupled to the input of the chrominance demodulator 12 and to a limiter circuit 24. The output of the limiter 24 is also applied to a separate input of the switch circuit 20. The circuit functions as follows.

An amplitude limited chrominance signal is eventually added to the restored reference carrier so that a new reference carrier is formed for the chrominance signal when a tint correction is necessary. The operation of the circuit is such that the phase of the reference oscillator wave is changed when the chrominance signal has a *+I* component, while little or no change takes place for chrominance signals having a *—I* component.

The output chrominance signal from amplifier 22 is applied to the limiter 24 which serves to amplitude limit the chrominance signal. This removes saturation information therefrom at the output of limiter 24. When the polarity of the *I* signal from the matrix 18 is positive, the switch 20 is closed, and the amplitude limited chrominance signal is applied to the reference oscillator output at the tint network 11 via the phase shifting network 21. This action adds the limited chrominance signal to the reference subcarrier signal at the tint network 11. The resultant reference wave varies in amplitude and phase as a function of the phase angle of the *I* signal passed by the switch 20. The phase shift afforded by network 21 is adjusted so that a chrominance vector in the *+I* direction or flesh direction coincides in phase with the reference carrier. Thus the demodulation of this chrominance signal proceeds undisturbed. When the matrix detector 18 produces a *—I* component, the switch 20 will be opened and the reference oscillator phase is not altered. However, chrominance signals on either side of the *+I* axis, when added to the reference carrier, rotate the reference carrier in the direction of the supplied chrominance signal. Thus the phase angle between the chrominance signal and the reference subcarrier signal, as originally transmitted, is reduced by any desirable degree. For example, adding a chrominance signal and reference subcarrier signal of equal amplitude reduces the phase angle therebetween to one half of its original value. A correction of this order is sufficient for most signal conditions. By varying the phase of the reference subcarrier while affecting its amplitude prior to demodulation enables one to demodulate the chrominance signals without affecting their amplitude as transmitted. This operation is obtained because of the action of the typical chrominance demodulator circuits 12 which are phase sensitive devices with respect to the balanced reference oscillator input. This is so as, for a reference subcarrier amplitude between relatively large values, the outputs of the chrominance demodulators 20 are purely a function of the amplitude and phase of the chrominance signals and re relatively unaffected by the amplitude of the reference oscillator signal which is a phase determining, switching signal. Therefore, the hue control circuitry described above will serve to rotate chrominance components with a *+I* vector component towards the *+I* or flesh axis without substantially affecting the amplitude of the demodulated chrominance signals. The rotation of such chrominance components towards the *+I* axis serves to eliminate the green and purple casts discussed above. These casts are due to chrominance components which should be demodulated along the *+I* axis but which have been undesirably phase shifted due to the above-noted propagation path and other disturbances.

The circuit operation serves to add the amplitude limited chrominance signal as phase shifted by network 21 to the reference subcarrier oscillator signal prior to application of that signal to the chrominance demodulators 12. As indicated, the addition takes place only when the matrix circuit 18 formulates a *+I* component. Accordingly, it can be shown and seen that the presence of a *+I* component serves to vectorially shift the phase of the reference subcarrier oscillator signal towards the *+I* axis. Thus demodulation of signals with a *+I* component provides, at the output of the demodulators, color difference signals which predominantly serve to represent flesh tone when applied to a suitable video display. By operating on the color reference subcarrier, one need not be concerned with amplitude variations as affecting saturation because of the nature of the demodulation process as described above. Therefore, the attendant phase shifting and tint compensation provided for by this circuit is associated with the maintenance of the chrominance components at the same amplitude as received. Thus the resultant display concerning all other colors not associated with the *+I* component is maintained as in a prior art conventional display. The overall results provide the viewer with an image which is substantially similar to those images that he normally would receive, but which exhibits improved flesh tone reproduction.

FIG. 2 is another block diagram of a portion of a color television receiver embodying this invention. The reference oscillator 30 is locked in frequency and phase to the transmitted burst signal and has its output applied to a phase shifting network 31 which, for example, provides a fixed phase shift $\phi_4$. The output of the phase shift network 31 is applied to an input of a phase detector 32. The other input of phase detector 32 receives amplitude limited chrominance signals. These signals are applied to this input of phase detector 32 via the chroma bandpass amplifier 33, whose output is coupled to a phase shift network 34. Network 34 is capable of providing a constant phase shift of $\phi_2$ for the chrominance signals. It is also assumed that the phase of the chrominance signals applied to the bandpass amplifier 33 is at the angle of $\phi_1$. The output of the phase shift network 34 is applied to the input of a limiter circuit 35, which then has one output thereof coupled to the above-mentioned input of the phase detector 32. The output of phase detector 32 is applied to the input of an RF filter 36, which serves to remove the chrominance subcarrier frequency (3.58 MHz) therefrom and provide a control voltage at the output thereof. This control voltage is then applied to the input of a modulator circuit 37 having another input supplied from the aforementioned limiter circuit 35. The output of the modulator 37 is applied to one input of a tint network 38. The other input of the tint network 38 is supplied via a manual tint network 39 taken from the output of the reference subcarrier oscillator 30. The tint network 39 provides a phase at the output thereof of $\phi_5$. It will also be assumed for purposes of description that the output phase of the reference subcarrier oscillator signal is at a phase of $\phi_3$.

The above phases are selected and aligned according to the following equations:

$$\phi_1 \cong \phi_I$$

where $\phi_I$ is equal to the phase angle of the $+I$ vector corresponding to that phase representative of flesh tone. Then:

$$\phi_1 + \phi_2 = \phi_5 \text{ and}$$

$$\phi_3 + \phi_4 = \phi_5$$

Therefore, if the chrominance signals contain the phase angle $\phi_1$ corresponding to flesh tone transmission or $\phi_I$, no correction is afforded by the circuitry. This is so as the phase detector 32 of FIG. 2 will receive the same phase, according to the above equations, at each input, namely, $\phi_5$. Therefore, no correction is afforded and the actual phase of the reference oscillator as uncompensated is used for demodulating flesh tone as applied to the demodulators 40 via the tint network 38. If $\phi_1$ is not equal to $\phi_I$, then $\phi_1 + \phi_2$ will not equal $\phi_5$. Referring to the above equations and FIG. 2, it can be seen that $\phi_3$ and $\phi_4$ are both constants for any receiver. That is to say, the phase of the reference subcarrier oscillator frequency $\phi_3$ when locked is always at a phase according to the transmitted burst and dependent upon the initial receiver setup. Therefore, $\phi_3$ is constant for any given receiver. $\phi_4$ is initially set up to satisfy the relationship indicated above and, once selected, is also constant. Therefore, the desired value of $\phi_5$ being equal to the sum of $\phi_3$ and $\phi_4$ is constant for a color transmission. When a color transmission occurs and the phase of the chrominance signals $\phi_1$ is different than $\phi_I$, the phase detector 32 provides at an output a voltage proportional to this difference. The phase detector 32 is setup so that it provides control signals for chrominance signal components which are in the vicinity of, but different from, the $+I$ phase. The control voltage signals also contain the 3.58 MHz component which is removed by the RF filter 36, and the varying video level, thus obtained, is applied to one input of the modulator 37. As indicated above, the other input of modulator 37 has applied thereto a limited chrominance signal. Modulator 37 behaves as a proportional gate which basically is a chracteristic of modulator performance. The modulator 37 serves to provide at its output a chrominance signal in accordance with the magnitude of the control voltage applied via the input coupled to filter 36. Thus at the output of modulator 37, there is provided a varying amplitude chrominance signal of a phase related to $\phi_1 + \phi_2$. This phase shifted chrominance signal is vectorially added to the color reference oscillator signal as was applied to the tint network 38 and of the phase $\phi_5$. The vectorial addition causes a new vector of a different phase at the color subcarrier reference frequency to be developed at the output of the tint network 38. This new vector provides a reference subcarrier oscillator frequency to the demodulators which causes the above-noted chrominance signals at phase $\phi_1$ to be demodulated along a new axis phase shifted towards the $+I$ axis.

Hence, the above circuit also serves, by changing the phase of the chrominance reference signal prior to demodulation, to compensate for signals having a $+I$ component in the vicinity of the flesh axis by placing such signals at that phase representative of the flesh axis. The circuit does not affect the amplitude of the chrominance signals as demodulated as it is operating on the reference subcarrier frequency, whose amplitude may vary without affecting the amplitude of demodulation.

The above-noted techniques are particularly adaptable to integrated circuit fabrication and a circuit operating according to the above-described concepts is shown and particularly of the type described in conjunction with FIG. 2.

Figure 3:
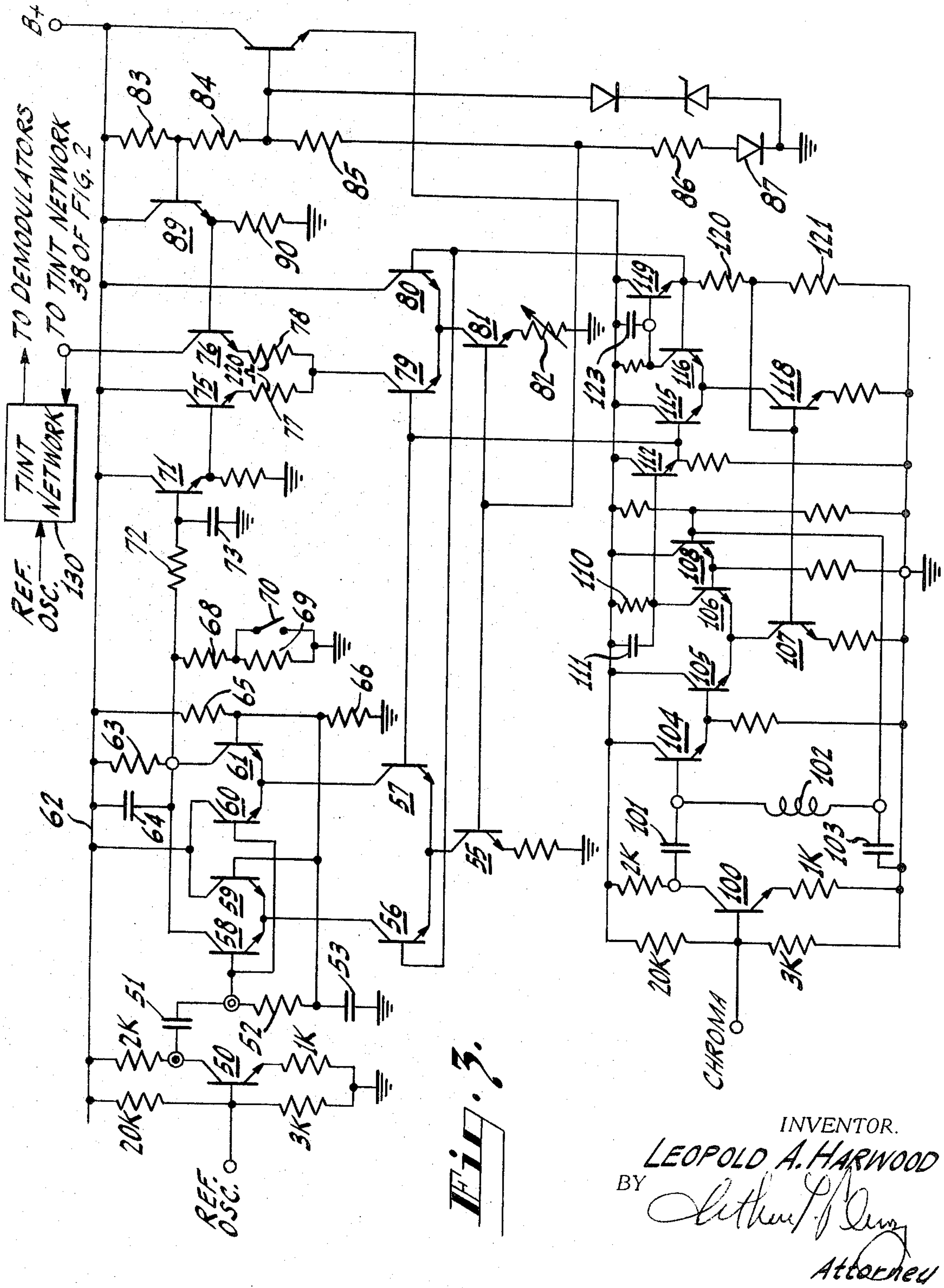
FIG. 3 is a detailed circuit schematic diagram of the tint correction system shown in FIG. 2.

Referring to FIG. 3, the reference oscillator signal as synchronized to the burst signal, derived from a burst separator included in the receiver and not shown, is applied to the input or base electrode of a common emitter buffer amplifier 50. The collector output of the buffer amplifier 50 is applied to a phase shifting network including capacitor 51, resistor 52 and capacitor 53. The phase shifting network is coupled to the input of a differential amplifier operating configuration in a phase detecting mode. The differential amplifier includes a constant current source transistor 55 having an emitter electrode returned to a point of reference potential and having a collector electrode coupled to the common emitter connection of transistors 56 and 57 forming the lower section of the differential amplifier. The collector electrodes of transistors 56 and 57 are coupled to one of a respective pair of emitter electrodes associated with switching transistor collector loads. The switching transistors 58 and 59 are used as the collector load for transistor 56, while switching transistors 60 and 61 are utilized as the collector load for transistor 57. The collector electrodes of transistors 59 and 60 are connected to the $B+$ terminal 62, while the collector electrode of transistors 58 and 61 are coupled to the B+ terminal 62 via the resistor 63 in shunt with a filter capacitor 64. A reference bias for the switching circuits is obtained by means of resistors 65 and 66 coupled between the $B+$ supply and a point of reference potential. The junction between resistors 65 and 66 is connected to the base electrode of transistors 61 and 59, and to the base electrode of transistor 58 via resistor 52. The output of the differential amplifier phase detector is taken from the collector electrode of transistors 61 and 58 and coupled to ground through the resistive network including resistors 68 and 69, resistor 69 being shunted by a switch 70. The collector electrode or output of the phase detector is also applied to the base electrode of an emitter follower transistor 71 via a resistor 72. The base electrode of transistor 71 is coupled to ground via capacitor 73. The combination of resistor 72 and capacitor 73 form a filter for bypassing 3.58 MHz signal as emanating from the phase detector. The emitter electrode of transistor 71 is direct coupled to the base electrode of a transistor 75 arranged in a modulator configuration with transistor 76. Transistors 75 and 76 have their emitter electrodes coupled together via the degenerating resistors 77 and 78. The junction between resistors 77 and 78 is coupled to the collector electrode of a chrominance driver transistor 79. Transistor 79 is part of a differential amplifier configuration including transistor 80 having the emitter thereof coupled to the emitter of transistor 79. Biasing for the modulator, including transistors 75 and 76, and the chrominance driver stage, including transistors 79 and 80, is obtained via a constant current transistor 81 having its collector coupled to the emitter electrodes of transistors 79 and 80 and the emitter electrode coupled to a point of reference potential via an adjustable resistor 82. The base electrode of transistor 81 is coupled to the base electrode of the above-noted constant current transistor 55. Both transistors 55 and 81 are referenced to a voltage divider including the series combination of resistors 83, 84, 85, 86 and diode 87 coupled between the B+ supply terminal 62 and the point of reference potential. A reference bias is supplied for the modulator configuration including transistors 75 and 76 via the emitter follower transistor 89 having its base electrode coupled to the junction between resistors 83 and 84 of the above-mentioned divider, and having its collector electrode coupled to B+. The emitter electrode of transistor 89 is coupled to a point of reference potential via resistor 90.

The chrominance signals are applied to the base electrode of a common emitter buffer amplifier 100. The collector electrode of buffer amplifier 100 is coupled to a point of reference potential via the phase shifting network including the collector of the 2,000 ohm resistor of stage 100, the series combination of capacitor 101, inductor 102 and capacitor 103. The junction between capacitor 101 and inductor 102 is coupled to the base electrode of an emitter follower transistor configuration 104. The emitter electrode of transistor 104 is coupled to the base electrode of differential amplifier including transistors 105 and 106 and a constant current source transistor 107. This differential amplifier is used as a limiting stage. A reference bias for transistor 106 is obtained from the emitter follower including transistor 108. The collector electrode of transistor 106 is utilized as the output of the limiter and has a load resistor 110 shunted by a capacitor 111. The collector output electrode of transistor 106 is applied to an emitter follower including transistor 112 which drives a second differential amplifier biasing stabilization stage including transistors 115 and 116 as biased from the constant current source 118. The constant current source transistor 118 has the base electrode thereof coupled to the same point on a voltage divider including resistors 120 and 121 coupled between the emitter electrode of emitter follower 119. The base electrode of transistor 119 is bypassed for chrominance signals by capacitor 123. The biasing stabilization is as follows. If the current increases through transistor 116, the voltage at the collector decreases. This causes the voltage at the emitter electrode of transistor 119 to decrease. The decrease in voltage is applied to the base electrodes of transistors 107 and 118, thus decreasing the current therethrough and hence increasing the collector voltages.

This differential amplifier including transistors 115 and 116, together with the emitter follower 119, then serves to control the quiescent operating point of the limiter amplifier to assure symmetrical limiting over a wide temperature range and for a plurality of different input signal conditions. Large signal operation might undesirably serve to shift the quiescent operating point of the limiting differential amplifier.

The stabilized limited chrominance signal, in accordance with the block diagram shown in FIG. 2, is applied via emitter follower 112 to the base electrode of transistor 57 forming part of the phase detector, and to the base electrode of transistor 79 forming part of the modulator. The biasing signal is also applied to the base electrode of transistor 56 via the emitter electrode of transistor 119 and to the base electrode of transistor 80 via the same emitter electrode. As indicated, transistor 56 forms part of the phase detector, while transistor 80 forms part of the above-noted modulator circuit. The operation of the circuit is according to the description given for FIG. 2. However, some of the particular circuit operating details will now be given.

The circuitry shown in FIG. 3 is particularly adaptable and suitable for integration.

For example, the phase detector including transistors 56 and 57 is a balanced differential configuration. As such it inherently serves to cancel reference carrier signal from the output at the collector of transistor 61 for the absence of chrominance signal and vice versa. The cancellation ability of the detector is dependent upon the similarity of operating characteristics of the transistors utilized as the active devices, and of the ratios between the resistive elements forming the voltage dividers.

Such desired transistors and resistor ratios can be accurately maintained utilizing integrated circuit techniques. The inherent balance therefore permits simple filtering of the 3.58 MHz signal; and the phase detector delivers a D.C. control voltage proportional to the phase difference between the amplitude limited chrominance signal and the reference subcarrier signal.

The D.C. control voltage is afforded by the circuit, as the switching transistors 58, 59, 60 and 61 controlled by the reference signal permit chrominance signal to flow into the output load of resistor 63 depending upon the instantaneous state of the switch transistors. The above current flow is primarily dependent upon phase as the chrominance signal is amplitude limited prior to application to the detector.

Switch 70 serves to load the output of the phase detector when the switch is closed. This action prevents the control signal from the phase detector from being applied to the modulator circuit including transistors 75 and 76.

The modulator circuit receives the filtered control voltage from the phase detector at the base electrode of transistor 75. Chrominance signal is applied to the emitter electrodes of transistors 75 and 76. Hence, as the control voltage goes positive, transistor 75 conducts harder, thereby raising the voltage at the emitter of transistor 76, which conducts less. Therefore, less chrominance signal is applied to the tint network. This causes a smaller phase change to be provided at the tint network 130. As the control voltage goes negative, more chrominance signal is applied to the tint network, thus resulting in a greater phase shift when this chrominance signal is added to the reference oscillator signal. The circuit, as indicated, is a modulator and provides a varying amplitude output chrominance signal for addition to the reference oscillator signal, which amplitude varies according to the magnitude of the control voltage.

The potentiometer 82 serves to aid in determining the full range of compensation to be provided by controlling the amplitude of the chrominance signals that are applied to transistors 75 and 76 via transistor 79.

Figure 4:
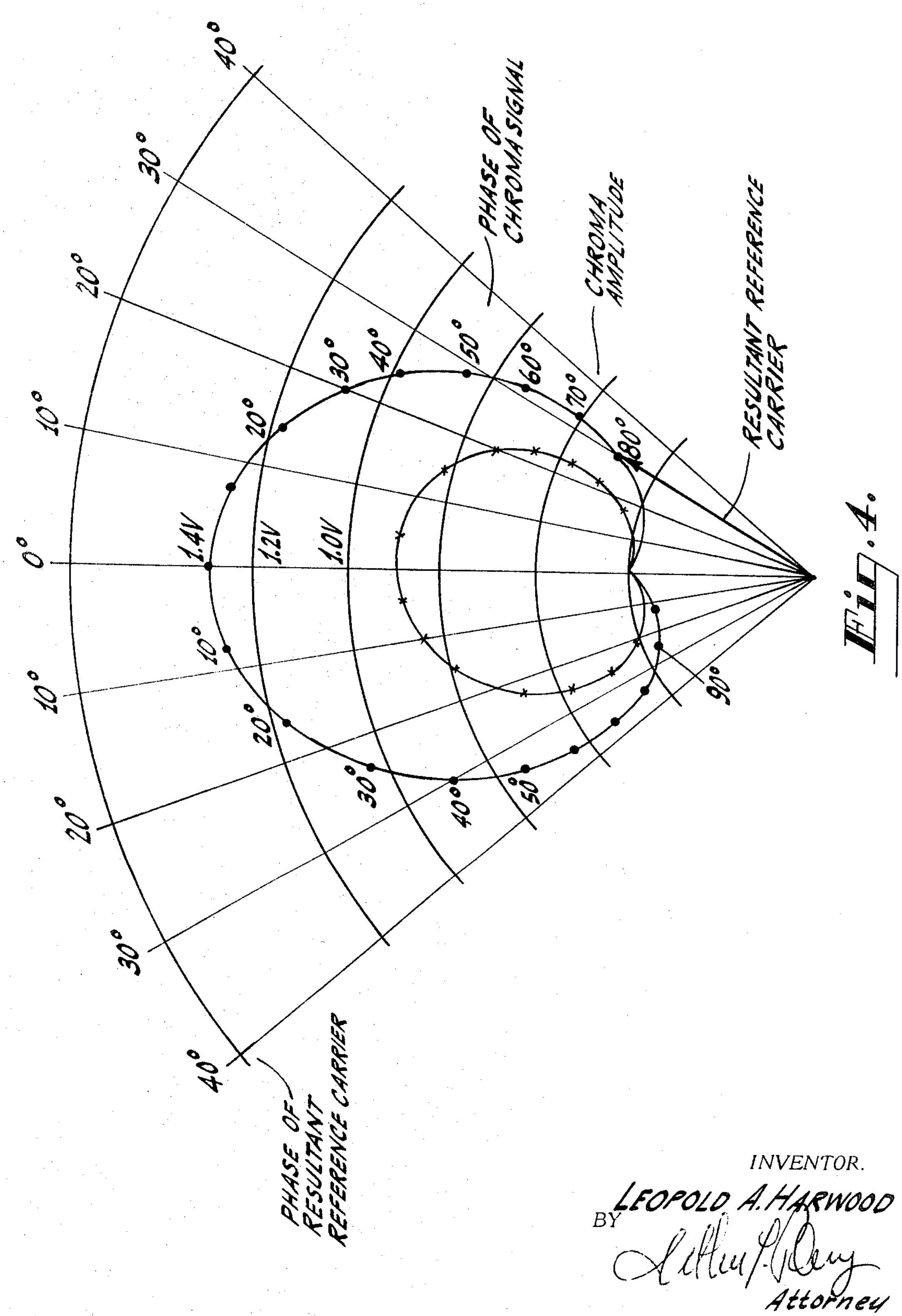
FIG. 4 is a graph showing the phase and amplitude of the chrominance signal as effecting the phase of a generated reference subcarrier signal according to the teachings of this invention.

FIG. 4 shows a graph of the locus of the reference carrier frequency as a function of the chrominance phase angle.

As the control voltage from the phase detector varies as a function of the phase difference between the carrier and chrominance signal, a new vector is provided of a magnitude in accordance with said control voltage.

The phase of the new vector can be related back to the phase of the chrominance, as explained. This new vector is then vectorially added to the reference carrier to provide a new resultant reference carrier for application to the demodulator.

The locus of the described operation is shown in FIG. 4 for two different amplitude chrominance signals.

It is also understood that while the techniques employed herein serve to perform tint correction in the environment of the receiver, similar techniques can be utilized to perform tint correction at the transmitter. For example, at the site of the transmitter and as briefly indicated above, there are many causes of flesh distortion as regarding studio lighting, tape, film and so on. The above described system can therefore be used at the transmitter by the studio operators so that the transmitted picture has proper flesh tone information therein. This is done after obtaining the chrominance components by again detecting those components which have phase angles about the $+I$ axis and causing these components to be modulate on the $I$ axis. In essence, the only difference between the transmitter apparatus and the receiver apparatus would be the fact that the reference signal being altered is applied to a modulator circuit in the case of the transmitter instead of a demodulator circuit in the case of the receiver.

It is also understood that the correction techniques described herein can be used with the PAL television system, using the same circuitry, but one would alternate the sign (i.e., plus and minus) of the chrominance phase shift network $\phi_2$. With this additional alteration the system operates as described.

What is claimed is:

1. In a communications system for the reception and transmission of signals having phase information representative of a first set of conditions and amplitude information representative of a second set of conditions, said signal further containing a reference signal of a frequency and phase necessary to demodulate said information contained therein, in combination therewith, apparatus for performing demodulation about a predetermined phase angle when said signals possess phase information in the vicinity of, but different from, said predetermined phase angle, comprising, a. means having one input responsive to said reference signal and a second input responsive to said signals to provide at an output thereof a control signal when said signals have said phase in the vicinity of, but different from, said predetermined phase angle, b. gating means responsive to said signals and said control signal, to cause said signals to appear at an output thereof during the presence of said control signal, c. combining means responsive to said gated signals and said reference signals to vectorially add said gated signal to said reference signal to provide a new reference signal, d. demodulating means responsive to said new reference signal and said signals to provide at an output thereof demodulated signals having demodulated information derived at a phase angle substantially equal to said predetermined phase angle.

2. In a color television system for the reception or transmission of a color television signal including a color reference subcarrier signal containing frequency and phase information necessary to demodulate chrominance signals contained in said television signal and having a phase representing the hue, and an amplitude representing the saturation of colors present in a scene, said system including color demodulators responsive to said chrominance signals and a color reference signal to provide at outputs thereof color difference signals containing information proportional to the hue and saturation of said colors contained in said scene, in combination therewith, apparatus for performing hue control for such color signals having hues representative of flesh tones, comprising, a. first means having one input responsive to said color reference signal and a second input responsive to said chrominance signals to provide at an output thereof a control signal when said chrominance signals have a phase in the vicinity of, but different from, that representative of flesh tones, b. selectively operative means responsive to said chrominance signal and said control signal to permit chrominance signal to appear at an output thereof during the presence of said control signal, c. means responsive to said reference signal and coupled to said output of said selectively operative means to combine said permitted chrominance signal with said reference signal to provide a new reference signal which, when applied to one of said color demodulators, will cause said demodulators to provide color signals at said output predominantly representative of the hue associated with flesh tones.

3. The apparatus according to claim 2 wherein said first means comprises:

a. a phase detector circuit having one input responsive to said chrominance signals and a second input responsive to said color reference signal to provide a control signal at an output thereof when said chrominance signals have a phase in the vicinity of, but different from, that representative of flesh tones.

4. The apparatus according to claim 2 wherein said selectively operative means comprises:

a. second means having first and second input terminals and an output terminal and adapted to conduct signal from said first terminal to said output terminal upon the application of said control signal to said second terminal, b. means coupling said second terminal to said first means for applying said control signal thereto, c. limiter means coupling said chrominance signals to said first terminal, for providing thereat an amplitude limited chrominance signal, d. third means coupling said output terminal of said second means to said color demodulator means for shifting the phase of said reference signal as applied to at least one of said demodulators during the presence of said control signal, and in accordance with said limited chrominance signal applied to said first terminal of said second means.

5. The apparatus according to claim 4 wherein said third means includes, a. a phase shifting network coupling said output terminal of said second means to said color demodulator means for providing a predetermined additional phase shift for said limited chrominance signal before application thereof to said color demodulator means.

6. In a color television receiver for the reception of a color television signal including a color reference subcarrier signal containing frequency and phase information necessary to demodulate chrominance signals contained in said television signal and having a phase representing the hue and an amplitude representing the saturation colors present in the transmitted scene in combination therewith, apparatus for performing dynamic hue control for such color signals having hues representative of flesh tones comprising, a. first means responsive to said chrominance signals to provide a control signal when said chrominance signals have a phase in the vicinity of, but different from, that representative of flesh tones, b. gating means responsive to said chrominance signals and said control signal to provide at an output thereof said chrominance signals only during the presence of said control signal, c. means coupled to said gating means and responsive to said color reference subcarrier signal to combine the gated chrominance signal with said color reference subcarrier signal to provide at an output thereof another color reference signal of different phase than that received, and d. demodulating means having a first input responsive to said another color reference signal and a second input responsive to said chrominance signals to provide at an output thereof a color signal containing information proportional to the hue and saturation of said colors transmitted in said scene and such information being displayed predominantly at flesh tone for the presence of said control signal.

7. In a color television receiver for the reception of a color television signal including a color reference subcarrier signal containing frequency and phase information necessary to demodulate chrominance signals contained in said television signal and having a phase representing the hue, and an amplitude representing the saturation of colors present in a transmitted scene, in combination therewith, apparatus for performing automatic hue control for such color signals having hues representative of flesh tones, comprising, a. color difference demodulators responsive to said chrominance signals and said color reference signal to provide at outputs thereof color difference signals containing information proportional to the hue and saturation of said colors contained in said transmitted scene, b. matrix means coupled to the outputs of said demodulators to provide a control signal when said control difference signals matrix about a predetermined phase axis in the vicinity of, but different from, that representative of flesh tones, c. means coupled to said matrix means and responsive to said control signal to shift the phase of said reference signal as applied to at least one of said demodulators in a direction to provide color difference signals at said outputs which matrix predominantly at the phase associated with flesh tones.

8. In a color television system for the reception or transmission of a color television signal including a color reference subcarrier signal containing frequency and phase information necessary to demodulate chrominance signals contained in said television signal and having a phase representing the hue, and an amplitude representing the saturation of colors present in a scene, said system including color demodulators responsive to said chrominance signals and a color reference signal to provide at outputs thereof color difference signals containing information proportional to the hue and saturation of said colors contained in said scene, in combination therewith, apparatus for performing hue control for such color signals having hues representative of flesh tones, comprising, a. a limiter circuit having an input responsive to said chrominance signals to provide at an output terminal thereof amplitude limited chrominance signals, b. phase detecting means having one input responsive to said color reference signal and a second input responsive to said amplitude limited chrominance signals to provide a variable control voltage at an output thereof when said chrominance signals have a phase in the vicinity of, but different from, that representative of flesh tones, c. first means having one input responsive to said control signal and a second input responsive to said limited chrominance signals to provide at an output thereof a variable amplitude chrominance signal having said amplitude proportional to the magnitude of said variable control signal, d. means coupled to said first means and responsive to said color reference signal for combining said chrominance signal with said reference signal to provide at an output another reference signal at a phase in accordance with the phase and amplitude of said variable amplitude chrominance signal, e. means for applying said another reference signal to at least one of said color demodulators to cause said demodulator to provide color signals at said output predominantly representative of the hue associated with flesh tones.

9. The apparatus according to claim 8 wherein said first means is a modulator circuit comprising, a. first and second transistors each having a base, collector and emitter electrode, b. first and second degenerating resistors coupled in series between said emitter electrodes of said first and second transistors, c. means coupled to the junction between said first and second resistors for applying said limited chrominance signals thereto, d. means coupled to one of said base electrodes of said transistors for applying said control signal thereto, and e. means coupled to one of said collector electrodes for obtaining a chrominance signal therefrom having an amplitude proportional to the magnitude of said applied control signal.

10. The apparatus according to claim 8 wherein said limiter circuit includes at least one differential amplifier comprising, a. first and second transistors each having a base, collector and an emitter electrode and having their emitter electrodes coupled together, b. a constant current source coupling said emitter electrodes to a point of reference potential, c. means coupled to one of said collector electrodes for providing a load impedance thereat for chrominance signals, d. means coupled to said base electrodes for application thereto of said chrominance signals.

11. In a color television receiver for the reception of a color television signal including a color reference subcarrier signal containing frequency and phase information necessary to demodulate chrominance signals contained in said television signal and having a phase representing the hue, and an amplitude representing the saturation of colors present in a transmitted scene, in combination therewith, apparatus for performing dynamic hue control for such color signals having hues representative of flesh tones, comprising, a. limiter means responsive to said chrominance signals to provide at an output thereof an amplitude limited chrominance signal, b. first means responsive to said chrominance signals to provide a control signal when said chrominance signals have a phase in the vicinity of, but different from, that representative of flesh tones, c. gating means responsive to said limited chrominance signals and said control signal to provide at an output thereof said limited chrominance signals only during the presence of said control signal, d. means coupled to said gating means and responsive to said color reference subcarrier signal to add said gated chrominance signal to said color reference subcarrier signal to provide at an output thereof another color reference subcarrier signal of a different phase than that received, e. at least one color demodulator having a first input responsive to said another color reference signal and a second input responsive to said chrominance signals to provide at an output thereof a color signal containing information proportional to the hue and saturation of said colors transmitted in said scene and such information being displayed predominantly at flesh tone for the presence of said control signal.

* * * * *

UNITED STATES PATENT OFFICE

CERTIFICATE OF CORRECTION

Patent No. 3,663,744 Dated May 16, 1972

Inventor(s) Leopold Albert Harwood

It is certified that error appears in the above-identified patent and that said Letters Patent are hereby corrected as shown below:

Column 4, line 23, that portion reading "re" should read -- are --.
Column 10, line 61, that portion reading "control", second occurrence, should read -- color --.

Signed and sealed this 24th day of October 1972.

(SEAL)
Attest:

EDWARD M.FLETCHER,JR.
Attesting Officer

ROBERT GOTTSCHALK
Commissioner of Patents